US009493861B2

(12) United States Patent
Oskarsson et al.

(10) Patent No.: US 9,493,861 B2
(45) Date of Patent: Nov. 15, 2016

(54) HIGH STRENGTH AND SAGGING RESISTANT FIN MATERIAL

(75) Inventors: Anders Oskarsson, Finspang (SE); Hans-Erik Ekstrom, Finspang (SE); Richard Westergard, Finspang (SE); Stian Tangen, Ardal (NO)

(73) Assignee: GRÄNGES SWEDEN AB, Finspång (SE)

( * ) Notice: Subject to any disclaimer, the term of this patent is extended or adjusted under 35 U.S.C. 154(b) by 462 days.

(21) Appl. No.: 12/574,477

(22) Filed: Oct. 6, 2009

(65) Prior Publication Data
US 2010/0012229 A1 Jan. 21, 2010

Related U.S. Application Data

(62) Division of application No. 11/974,522, filed on Oct. 12, 2007.

(30) Foreign Application Priority Data

Oct. 13, 2006 (SE) ...................................... 0602165

(51) Int. Cl.
C22C 21/00 (2006.01)
B22D 11/00 (2006.01)
(Continued)

(52) U.S. Cl.
CPC ............. C22C 21/00 (2013.01); B22D 11/008 (2013.01); B23K 35/0238 (2013.01);
(Continued)

(58) Field of Classification Search
CPC .................................................. B22D 11/008
USPC ................... 420/532; 148/696, 552; 428/654
See application file for complete search history.

(56) References Cited

U.S. PATENT DOCUMENTS 4,235,628 A 11/1980 Althoff et al.
4,290,586 A 9/1981 Kane et al.
(Continued)

FOREIGN PATENT DOCUMENTS

JP 3-287738 A 12/1991
JP 04066292 A * 3/1992 ............. B23K 35/22
(Continued)

OTHER PUBLICATIONS

Machine translation of JP 2002161323, 2002.*
(Continued)

Primary Examiner — Rebecca Lee
(74) Attorney, Agent, or Firm — Morgan, Lewis & Bockius LLP

(57) ABSTRACT

The present invention provides a method for producing AlMn strip or sheet for making components by brazing, as well as the products obtained by said method. In particular this method is related to fin materials used in heat exchangers. The fins can be delivered with or without a cladding depending on application.

Rolling slabs are produced from a melt which contains 0.3-1.5% Si, ≤0.5% Fe, ≤0.3% Cu, 1.0-2.0% Mn, ≤0.5% Mg, ≤4.0% Zn, ≤0.3% each of elements from group IVb, Vb, or VIb elements, and unavoidable impurity elements, as well as aluminum as the remainder in which the rolling slabs prior to hot rolling are preheated at a preheating temperature of less than 550° C., preferably between 400 and 520° C., more preferably between 450 and 520° C. to control the number and size of dispersoid particles, and the preheated rolling slab is hot rolled into a hot strip. The strip is thereafter cold rolled into a strip with a total reduction of at least 90%, and the cold rolled strip is heat treated to obtain a 0.2% proof stress value that is 50-90% of its proof stress value in the as cold rolled condition to a proof stress value in the range between 100 and 200 MPa. The strip may alternatively be produced by twin-roll strip casting.

The composition of the melt tailors the microstructure development during the complete processing to give the desired post braze properties and performance during brazing in combination with adequate delivery properties of the strip. In particular the high post braze strength combined with a good sagging resistance and low susceptibility to liquid core penetration during brazing, as well as a relatively good formability in the delivery condition prior to fin forming.

22 Claims, 2 Drawing Sheets

(51) Int. Cl.
*B23K 35/02* (2006.01)
*B32B 15/01* (2006.01)
*C22F 1/04* (2006.01)
*F28F 21/08* (2006.01)
*B23K 35/28* (2006.01)

(52) U.S. Cl.
CPC ............ *B32B 15/01* (2013.01); *B32B 15/016* (2013.01); *C22F 1/04* (2013.01); *F28F 21/084* (2013.01); *B23K 35/286* (2013.01); *B23K 2201/14* (2013.01)

(56) References Cited

U.S. PATENT DOCUMENTS

| | | |
|---|---|---|
| 4,362,580 A | 12/1982 | Kane et al. |
| 5,109,562 A | 5/1992 | Albrecht |
| 5,324,415 A | 6/1994 | Blumenthal et al. |
| 5,476,725 A | 12/1995 | Papich et al. |
| 5,851,369 A | 12/1998 | Cai |
| 6,093,295 A | 7/2000 | Zhuiykov et al. |
| 6,165,291 A | 12/2000 | Jin et al. |
| 7,608,345 B2 | 10/2009 | Bürger et al. |
| 8,142,575 B2 | 3/2012 | Oki et al. |
| 2001/0016175 A1 | 8/2001 | Koch et al. |
| 2003/0042290 A1 | 3/2003 | Wagner et al. |
| 2003/0084728 A1 | 5/2003 | Boltz |
| 2006/0105193 A1* | 5/2006 | Burger et al. ............... 428/654 |
| 2007/0099023 A1 | 5/2007 | Dulac et al. |
| 2008/0118393 A1 | 5/2008 | Oskarsson et al. |
| 2011/0315748 A1 | 12/2011 | Dulac et al. |

FOREIGN PATENT DOCUMENTS

| | | | |
|---|---|---|---|
| JP | 06184688 A * | 7/1994 | ............ C22C 21/00 |
| JP | 7-90444 | 4/1995 | |
| JP | 8-246117 A | 9/1996 | |
| JP | 2000-61624 | 2/2000 | |
| JP | 2000-351092 | 12/2000 | |
| JP | 2002161323 A * | 6/2002 | ............ C22C 21/00 |
| JP | 2004-176090 | 6/2004 | |
| JP | 2005-220375 | 8/2005 | |
| JP | 2008-517152 | 5/2008 | |
| RU | 2218437 C1 | 12/2003 | |
| RU | 2255132 C1 | 6/2005 | |
| SE | 510272 C2 | 5/1999 | |
| SU | 671962 A1 | 7/1979 | |
| WO | WO-0153553 A1 | 7/2001 | |
| WO | WO-02070189 A2 | 9/2002 | |
| WO | WO-03089237 A1 | 10/2003 | |
| WO | WO 2005/061165 | 7/2005 | |

OTHER PUBLICATIONS

"U.S. Appl. No. 11/974,522, Response filed Sep. 29, 2009 to Restriction Requirement mailed Aug. 31, 2009", 7 pgs.
"U.S. Appl. No. 11/974,522, Restriction Requirement mailed Aug. 31, 2009", 6 pgs.
"U.S. Appl. No. 11/974,522, Advisory Action mailed May 6, 2010", 3 pgs.
"U.S. Appl. No. 11/974,522, Examiner Interview Summary mailed Jun. 17, 2010", 3 pgs.
"U.S. Appl. No. 11/974,522, Final Office Action mailed Feb. 26, 2010", 7 pgs.
"U.S. Appl. No. 11/974,522, Non-Final Office Action mailed Oct. 23, 2009", 11 pgs.
"U.S. Appl. No. 11/974,522, Response filed Jan. 25, 2010 to Non Final Office Action mailed Oct. 23, 2009", 16 pgs.
"U.S. Appl. No. 11/974,522, Response filed Apr. 26, 2010 to Final Office Action mailed Feb. 26, 2010", 14 pgs.
"U.S. Appl. No. 11/974,522, Response filed Jun. 28, 2010 to Advisory Action mailed May 6, 2010", 15 pgs.
"European Application Serial No. EP07118217, Partial European Search Report dated Nov. 2, 2009", 7 pgs.
"Typical mechanical properties of wrought aluminum alloys", Advanced Materials & Processes, 156(6), (Dec. 1999), 89-93.
Altenpohl, Dietrich, "X. Removal of Work Hardening through Heat Removal", Aluminum Viewed from Within: an Introduction into the Metallurgy of Aluminum Fabrication, Düsseldorf : Aluminium-Verlag, 1st ed.. Book xii, 225 p., (1982), 132-135.
Doko, T., et al., Furukawa Review, 9, (Aug. 1991), 47-54.
English Translation of Notice of Reasons for Rejection for Japanese Application No. P2007-265815, dated Jan. 29, 2013.
Verified partial translation of JP 2002-161323 (front page and paragraph [0025]).
Notice of Reasons for Rejection, with English translation, for Japanese Patent Application No. P2007-265815, dated May 21, 2013.

* cited by examiner

HIGH STRENGTH AND SAGGING RESISTANT FIN MATERIAL

RELATED

This application is a divisional application of U.S. patent application Ser. No. 11/974,522, filed Oct. 12, 2007, which application claims priority under 35 U.S.C. 119 to Sweden Application No. 0602165-3, filed Oct. 13, 2006, which applications are incorporated herein by reference and made a part hereof.

BACKGROUND

The present invention relates to a method for producing AlMn strip or sheet for producing components by brazing, as well as the products obtained by said method. In particular this method is related to fin materials used in heat exchangers. The fins can be delivered with or without a braze cladding depending on application.

A challenge today is to manufacture light-weight components for the automotive market. A lot of research is therefore directed to reduce the weight of heat exchangers by using thinner strip without sacrificing, but instead often improving, other product and manufacturing properties. To be able to do this it is necessary to create new materials with higher post braze strength compared to the alloys presently used but still with adequate corrosion properties. For fins this means that they normally should be sacrificial compared to other parts of the heat exchanger by having a lower corrosion potential than those. The increased fin strength has to be achieved in modern CAB furnaces, which restricts the use of certain alloying elements like Mg, previously used in strip for vacuum brazing. The fins must be easy to handle for the manufacturer and are always slightly deformed prior to brazing which puts some requirements on formability in the delivery condition. The fin strip is always delivered in thin, 50-200 µm, and cut narrow strip, making it very difficult to handle if fully soft annealed. Therefore the strip is normally delivered in half hard condition with restricted formability.

To reach higher post braze strength levels is quite complicated without hazarding the brazing performance described as sagging resistance and resistance to liquid core penetration during brazing or the necessary formability when forming the fins out of the strip. Only when these requirements are met consistently by the new materials, this will allow the use of thinner fins with a high post brazed strength, thereby reducing the weight compared to the products used today.

PRIOR ART

In a previous method known from SE-C2-510 272 an alloy is used comprising ≤0.7% Fe, 1.4-2.0% Mn, 0.5-1.5% Si, ≤0.5% Mg, ≤0.1% Cu, ≤2.5% Zn, 0.05-0.3% Zr, and the remainder aluminium except for unavoidable impurity elements. The cast ingots are preheated at not more than 550° C. for less than 12 hours prior to hot rolling followed by cold rolling, an intermediate annealing and a final cold rolling to the delivery temper of H14. After brazing the material has a strength of only 50 MPa. The sagging resistance during brazing for a 0.1 mm thick strip was 14 mm and this is considered to be quite good for the method used. However, the as delivered strip had an elongation, $A_{50mm}$, of only 1.5% and liquid core penetration during brazing was not considered.

A method for producing strip or sheet for heat exchangers is known from U.S. Pat. No. 6,743,396 in which an alloy is described containing ≤0.5% Fe, 1.0-1.8% Mn, 0.3-1.2% Si, ≤0.3% Mg, ≤0.1% Cu, ≤0.1% Zn, ≤0.1% Ti, 0.05-0.4% Cr+Zr, ≤0.15% Sn the remainder aluminium and unavoidable impurities, the ratio % Sn/% Si being ≥0.03. Ingots are cast, which are subsequently preheated to an initial rolling temperature less than 520° C. for at most 12 hours and hot rolled to a thickness between 2 and 10 mm with a final hot rolling temperature not less than 250° C. The cold rolling to the final thickness between 50 µm and 500 µm which follows is performed without intermediate annealing. A final annealing is given at a temperature of at least 300° C., which means that the material is fully or substantially recrystallized. After brazing a 0.2% proof stress value of at least 60 MPa is achieved. In this document nothing is said about sagging or liquid core penetration during brazing and the formability in the delivery gauge is not mentioned. The patent focuses only on post braze strength and corrosion resistance of the fin. The high final annealing temperature would normally give a fully or partially recrystallised structure according to the patent description by the inventors.

An Al—Mn alloy with a "high" strength is known from U.S. Pat. No. 4,235,628 but the post brazed 0.2% proof stress value is only 50 MPa. The alloy composition is 0.8-2% Mn, 1.4-3% Si, 0.2-1% Fe, 0-0.2% Cu, 0-0.2% Mg and the remainder Al with up to 0.2% impurities. The material is finally annealed at a temperature above 450° C. Nothing is said about the sagging resistance or liquid core penetration during brazing. The high silicon content would without doubt give an alloy sensitive for liquid core penetration during brazing.

In JP08246117 an alloy comprising 0.6-1.6% Mn, 0.05-0.8% Si, 0.1-1.0% Cu, 0.05-0.5% Mg and Cr, Ti or Zr up to 0.3% is disclosed. A number density interval of small particles, 0.02-0.2 µm in size, is mentioned for the material which is processed by ingot casting, pre heating below 500° C. prior to the hot rolling which is followed by cold rolling, annealing and a final cold rolling at a ratio of 20-80%. The material is intended as a tube with a sacrificial surface layer and therefore irrelevant for fin requirements and applications.

In JP03287738 a sagging resistant material is obtained by using a specific aluminium composition and a process leading to H14 or H24 temper and by using an intermediate annealing during processing. The material is used in vacuum brazing and contains high amounts of Mg, 0.3-1.5%, that are not acceptable for brazing in CAB furnaces. Without the high Mg content this material will not provide the desired microstructure required for the high post braze strength. A material with such high Mg content will not give the low susceptibility to liquid core penetration required by manufacturers of heat exchangers today. Nothing is mentioned about sensitivity for liquid core penetration during brazing or the formability in the delivery gauge. Also the Mn content is too low to achieve the higher strengths required when down gauging to thinner material.

In brazed exchangers it is normally necessary to chose different alloys in different parts in fins, tubes, plates and headers to avoid corrosion to perforation of tubes and plates by sacrificing the fins. This is often done by alloying the fins with Zn to reduce their corrosion potential to an adequate level compared to other parts. In a consequence to this, materials used for tubes and plates normally have additions of Mn and Cu with the aim to increase their corrosion potential. This is one of the reasons why the optimum composition and processing for fins is quite different from processing of tubes or plates.

It has been shown in the practical testing of the material produced according to the previously known methods that the properties of the aluminium strip are insufficient for certain applications when the manufacturers need to down gauge. This particularly applies for the high post braze strength combined with the good sagging resistance and low susceptibility for liquid core penetration of the material together with the formability requirements to produce the fins from the strip.

It has been found that by a very accurate control of the net driving force for recrystallisation of the material during brazing, a combination of an outstanding post braze strength together with good sagging resistance and low susceptibility for liquid core penetration during brazing is obtained. The net driving force for recrystallisation is the driving force created by stored rolling deformation minus the retarding pressure given by the number density of particles.

The material obtained has got a high strength after brazing in a unique combination with good brazing performance like a high sagging resistance and a low susceptibility for liquid core penetration during brazing and a good formability in the delivery temper. The fin material has a corrosion potential that may be adjusted to other parts of the heat exchanger like tubes so that the tubes can be protected by a sacrificial fin material. The material may be used to make products by any brazing method, in particular the controlled atmosphere brazing method (CAB).

DETAILED DESCRIPTION OF THE INVENTION

Figure 1:
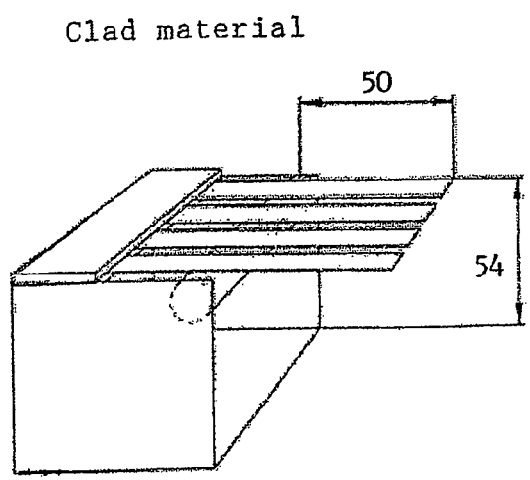
FIG. 1a shows a rig with mounted samples used for the sagging tests of clad strip, using a cantilever beam length of 50 mm.
FIG. 1b shows a rig with mounted samples used for the sagging tests of unclad strip, using a cantilever beam length of 60 mm.
Figure 1:
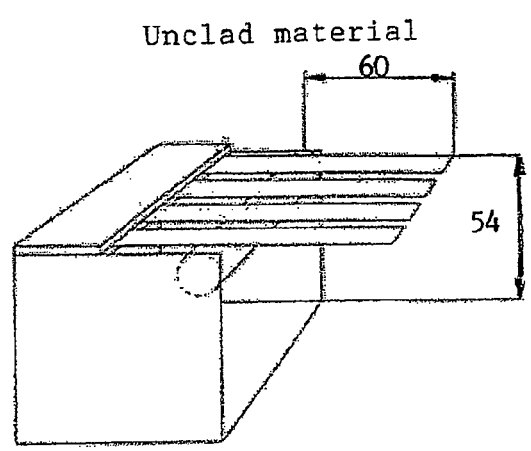

The object of the present invention is a method for producing aluminium strip, which after brazing have a relatively very high strength combined with very good brazing performance, described as a high sagging resistance and a very low susceptibility to liquid core penetration during brazing, as well as reasonably good forming properties in the as delivered strip condition. The sheets are intended for fin applications in heat exchangers produced by CAB brazing, but can also be produced by vacuum brazing.

This is achieved by the method according to the present invention for producing AlMn sheets in which a rolling slab is produced from a melt which contains (in weight-percent) 0.3-1.5% Si, ≤0.5% Fe, ≤0.3% Cu, 1.0-2.0% Mn, ≤0.5% Mg, ≤4.0% Zn, ≤0.3% of each of elements from group IVb, Vb, or VIb elements, the sum of these elements being ≤0.5%, and unavoidable impurity elements, whose individual amounts are at most 0.05% and whose sum is at most 0.15%, as well as aluminium as the remainder in which the rolling slab prior to hot rolling is preheated at a preheating temperature of less than 550° C., preferably between 400 and 520° C., more preferably between 450 and 520° C., especially more than 470 up to 520° C., to control the number and size of dispersoid particles (particles precipitated from supersaturated solid solution), whereafter the preheated rolling slab is hot rolled into a hot strip. All amounts of alloying elements hereafter given are in weight percent. Normal total hot rolling height reduction of the strip thickness is >95%. The hot strip exit gauge is in the range from 2 to 10 mm. The strip may be annealed after hot rolling or at a cold rolled thickness above 0.5 mm.

The strip is thereafter cold rolled into a strip with a total reduction of at least 90%, preferably above 95%, most preferably above 97.5% and the cold rolled strip is heat treated to obtain a proof stress value that is 50-90% of its proof stress value in the as cold rolled condition (not fully soft annealed) to a 0.2% proof stress in the range between 100 and 200 MPa, more preferably in the range 120-180 MPa, most preferably 140-180 MPa. The strip material then has a microstructure comprising a number density of particles in the range between 1 and $20 \times 10^6$, preferably between 1.3 and $10 \times 10^6$, most preferably between 1.4 and $7 \times 10^6$ particles/mm$^2$ the particles having an equivalent diameter in the range of 50-400 nm. The majority of these fine particles are created during the preheating prior to hot rolling. A description on how the particle density was measured is described in example 1.

Alternatively, the same alloy composition can be cast by continuous casting into a strip, e.g. by twin-roll strip casting, such as described in EP1250468. The as-cast strip is further rolled to form an intermediate gauge article, which is then annealed, and once again cold rolled with a rolling reduction of at least 60%, preferably above 75%, so as to obtain a finstock material of final gauge, which has first proof stress value. The finstock material is heat treated to the delivery temper with the purpose to soften the material by a tempering without any recrystallisation of the strip alloy, in such a way that a strip is obtained having a second proof stress value which is 10-50% lower, preferably 15-40% lower, than that obtained directly after the second cold rolling, whereby the resulting 0.2% proof stress lies in the range of 100-200 MPa, preferably 120-180 MPa, more preferably 120-160 MPa. The strip material then has a microstructure comprising particles having a diameter in the range of 50-400 nm with a number density of particles in the range between $1 \cdot 10^6$ and $20 \cdot 10^6$, $1.3 \cdot 10^6$ and $10 \cdot 10^6$, preferably between $1.4 \cdot 10^6$ and $7 \cdot 10^6$ particles/mm$^2$. The majority of the particles have been created during the intermediate annealing.

Typical thickness of the cold rolled finished strip is less than 0.2 mm, preferably less than 0.15 mm, most preferably less than 0.10 mm. The material only has the desired properties for the tempered state, for example in the state H22, H24 or in the state H26 (strain hardened, re-annealed to ¼, ½ and ¾ hardness respectively). The annealing treatment is performed as re-annealing in the coil or in a continuous annealing furnace using a temperature to be adjusted accordingly.

The present invention is based on a composition of the melt used to tailor the microstructure development during the complete processing to give the desired post braze properties and performance during brazing in combination with adequate delivery properties of the strip. In particular the high post braze strength combined with a good sagging resistance and low susceptibility to liquid core penetration during brazing, as well as a relatively good formability in the delivery condition prior to fin forming is the focus for this invention. The post braze 0.2% proof stress value is at least 60 MPa, and normally about 70 MPa. The sagging resistance of the material is ≤35 mm, more preferably ≤30 mm, most preferably ≤25 mm, when measured as defined in example 1 on a strip less than 0.1 mm in thickness. No severe liquid core penetration occurs during brazing. The formability measured as fracture elongation, $A_{50mm}$, is normally above 3%. As the coil always is cut in rather narrow strip before delivery, all mechanical properties are measured and defined in the rolling direction.

A high degree of deformation increases the driving force while a high number of small particles retard the driving pressure for recrystallisation. The driving force increases with increased rolling reduction, especially cold reduction, but will be decreased by recovery during the final temper annealing. The strength in the delivery condition for this type of alloy and processing is proportional to the driving force. The number of small particles should be controlled by the pre-heating to less than 550° C., preferably between 400 and 520° C., more preferably between 450 and 520° C., and especially between 470 and 520° C. prior to hot rolling in combination with mainly the chemical composition. The number density of particles is proportional to the retarding pressure hindering recrystallisation. It is of uttermost importance to control the driving force and the retarding pressure quantitatively to achieve the good material properties at the different stages mentioned above. Control of the process within the ranges claimed in this invention gives a high reproducibility of the material properties.

Mn in dispersoid particles and in solid solution increases the post braze strength. Furthermore, Mn in a controlled number of particles is beneficial to control the sagging resistance and sensitivity to liquid core penetration as these particles control the recrystallisation process during braze heating leading to the formation of large recrystallised grains. The content of the melt provided according to the present invention of at least 1.0 to at most 2.0% supports the strength of the strip according to the present invention. Optimized properties may be reliably achieved if the Mn content is at least 1.3% and at most 1.8%, even more preferably if the Mn content is between 1.4 and 1.7%.

Fe has an adverse effect mainly as it increases the risk for formation of large intermetallic constituent particles formed during solidification. It then limits the amount and use of Mn in the material. It is therefore limited to 0.5%, preferably to 0.3%.

Si decreases the solubility of Mn and creates a high density of dispersoid particles combined with Mn. This promotes high strength and good sagging resistance. Some Si is also in solid solution. Both in solid solution and in dispersoid particles, Si adds to the strength. Too high level of Si increases the risk for liquid core penetration during brazing. The Si content of the core should be 0.3-1.5%, preferably 0.5-1.1%, most preferably 0.65-0.95%. For material that is to be braze clad, the Si content should be 0.3-1.5%, preferably 0.4-1.1%, most preferably 0.45-0.9%, the contents of all other components being the same as for an unclad material.

The strength and sagging resistance may be further improved by the addition of group IVb, Vb, or VIb elements, or combinations of these elements, to the alloy according to the present invention, as some of these elements will add to the number density of fine dispersoid particles. The individual content of these dispersoid forming elements should be lower than 0.3%, and the sum of these elements ≤0.5% to avoid formation of coarse constituent particles formed during solidification. Such particles have a negative influence on the formability and strength of the strip produced according to the present invention. The content of the group IVb, Vb, or VIb elements should preferably be in the range 0.05-0.2%. Preferably ≤0.3% Zr is used as the dispersoid forming element from these groups, preferably in the range 0.05-0.2%, more preferably 0.1-0.2%. Furthermore, in combination with Mn and Fe, Cr may lead to very coarse constituent particles. Therefore, in the alloy used according to the present invention, if Cr is added the Mn content has to be reduced.

The content of Cu is limited to at most 0.3%, preferably below 0.1%, in the alloy used according to the present invention. Cu increases the strength, but also leads to a positive corrosion potential which is not desired in fin materials. A positive corrosion potential restricts the possibilities of combination with other materials in a brazed heat exchanger. In addition, the corrosion behaviour, particularly in regard to intercrystalline corrosion, worsens with increasing Cu content.

Small amounts of Mg may be added to an alloy used according to the present invention as a strength increasing element. However, since Mg has a very strong negative influence on the brazeability in CAB, the content of magnesium is restricted to at most 0.5%, preferably to below 0.3%, most preferably to below 0.1%. It furthermore increases the risk for incipient melting of the material at the brazing temperature.

Zn may be added to decrease the corrosion potential of the fin material and thereby provide the tubes with a cathodic protection by sacrificing the fins. By using an adjustable Zn content in the fin, the difference in corrosion potential between tubes and fins can be chosen to an adequate level for each application. The Zn content used is normally restricted to 4.0% and is more preferably between 0.5 and 2.8%.

The amount of Sn should preferably be kept below 0.009% to avoid problems at rolling.

For brazing of the strip produced according to the present invention, it may be favourable to the mechanical strength if the strip is clad on one or both sides, using cladding layer thicknesses of 3% to 20% of the total thickness of the strip on each side. The alloys concerned may, for example, be typical brazing alloys based on Al—Si (Si 7-13%), such as AA4343, AA4045 or AA4047, as well as typical protective claddings based on commercially pure Al alloys (AA1XXX, Si 0-0.5%) and the modifications of these alloys (Si 0.5-7% or Si 0.6-6.5%), such as Al alloys having a Si content of 1, 2, 3, 4, 5 or 6% Si. The cladding is preferably applied in this case by roll cladding.

EXAMPLES

Example 1

Two ingots of material A1 and A2 with a composition of 0.8-0.9% Si, 0.2% Fe, 1.6% Mn, 0.11-0.12% Zr, 1.5-1.6% Zn and other elements each less than 0.05% were DC-cast pre-heated below 550° C. and hot rolled with a total hot reduction of 99% prior to cold rolling. Material A1 was directly cold rolled to final gauge and annealed at different temperatures. Some material was fully soft annealed to O temper, some was recovery annealed to H24 temper and some was not annealed at all giving H18 temper. Material A2 was recrystallisation annealed before final cold rolling to H14 temper. All samples were exposed to a heat treatment to simulate brazing at 600° C.

The properties are shown in Table 1.

The sagging resistance was measured according to the following method: The material is mounted in a special rig as shown in FIG. 1. Samples 15 mm wide were cut across the rolling direction and at least 90 mm along the rolling direction. Four samples were mounted in the rig. The cantilever beam length was 60 mm, and the free end of the cantilever was 54 mm above the surface of the measuring table.

The rigs were placed in the oven and the temperature was raised according to the following cycle:

20° C.→400° C./25 min.+400° C./5 min.+400° C.→600° C./13 min.+600° C./10 min

The samples were removed immediately after the last soak at 600° C.

TABLE 1

Properties of materials A1 and A2. The sagging resistance was measured using a cantilever beam length of 60 mm.

| | | | | | Mechanical properties | | | |
| --- | --- | --- | --- | --- | --- | --- | --- | --- |
| | | Final cold | Pre-braze | Pre-braze | | Post-braze | | Sagging |
| Material | Temper | reduction [%] | $A_{50\,mm}$ [%] | $R_{p0.2}$ [MPa] | Gauge [mm] | $R_{p0.2}$ [MPa] | $R_m$ [MPa] | Distance (mm) |
| A1 | H18 | ~98 | 1.2 | 240 | 0.10 | 62 | 143 | 41 |
| A1 | H24 | | 1.3 | 193 | 0.10 | 63 | 150 | 32 |
| A1 | O | | 5.4 | 64 | 0.10 | 66 | 150 | 14 |
| A2 | H14 | 46 | 2.2 | 188 | 0.10 | 49 | 127 | 26 |

The results show that a much higher post braze strength is obtained with the non-interannealed O, H24 and H18 tempers compared to the H14 delivery temper.

Example 2

Three ingots from the very same charge, with composition of 0.8% Si, 0.2% Fe, 1.6% Mn, 0.12% Zr, 1.6% Zn and other elements each less than 0.05%, were pre heated at different temperatures prior to hot rolling to improve the delivery formability and sagging resistance during brazing. The final temperatures and total heating times for the different ingots were for B1—457° C./11 hours, B2—490° C./15 hours, B3—540° C./21 hours. The materials were hot rolled, cold rolled and recovery annealed to H24 temper. The properties of 0.1 mm final strip are given in Table 2.

TABLE 2

Properties measured for material B.

| Material | Pre heating Temp/total time | As delivery $Rp_{0.2}$ [MPa] | As delivery $A_{50\,mm}$ [%] | Sagging distance [mm] |
| --- | --- | --- | --- | --- |
| B1 | 457° C./11 hours | 184 | 3.8 | 22 |
| B2 | 490° C./15 hours | 175 | 6.8 | 18 |
| B3 | 540° C./21 hours | 197 | 4.4 | 30 |

The sagging resistance was measured using a cantilever beam length of 60 mm.

The results show that there is an optimum temperature and time for preheating prior to hot rolling to achieve the best combination of formability as delivery temper and sagging resistance during brazing. A decrease of the delivery 0.2% proof strength from 197 MPa to 175 MPa significantly improves the sagging resistance during brazing.

Example 3

The effect of delivery temper was investigated on braze clad strip of a material C with following composition:

Core Mn=1.6%, Si=0.8%, Fe=0.2%, Zn=1.5%, Zr=0.11%, other elements each less than 0.05%. Braze clad Si=7.7%, Fe=0.1%, other elements each less than 0.05%. The material is clad with 10% on each side. Cladding was carried out during hot rolling.

The material was DC-cast, followed by pre heating below 550° C., hot rolling to 4 mm and cold rolling to 0.10 mm final thickness. The material in H14 condition was fully soft annealed at 0.17 mm intermediate gauge. All samples in this example are taken from the identical mother coil. The different samples could be taken by splitting the coil in different parts.

To measure the particle density of the material sections were cut in the longitudinal, ND-RD, plane of the strip. The sections were mechanically polished using Struers OP-S suspension, containing 0.04 μm colloidal silica, in the last preparation step. The area cross-sections of the particles were measured in a FEG-SEM, Philips XL30S, using an image analysis system from Oxford Instruments, IMQuant/X.

Images for the measurements were recorded in the backscatter mode using the "in-lens" detector in the microscope. The measurements were made at a magnification of X40000 times (related to the SEM display). In order to minimize the information depth and to get a good spatial resolution in the backscatter image, a low acceleration voltage, 3 kV, was used. Common grey level threshold was used to detect the particles. In order to obtain a result that is representative of the number and distribution of the particles in the sample, the measured image frames were spread over the cross section. Measurements were made on at least seven positions equally distributed over the thickness (ND) direction of the strip sample. The distance between each image frame in the longitudinal direction was at least 15 μm. More than 1000 particles were measured. The area, A, of each particle is measured and an equivalent particle diameter is calculated as $\sqrt{(4A/\pi)}$.

The samples had prior to brazing a number density of particles within the size range 50-400 nm of $2.3 \times 10^6$ particles per mm². The proof stress and elongation values prior to brazing, the sagging resistance and risk for liquid core penetration as well as the post braze strength for the different conditions are shown in Table 3. The post braze strength is considerably lower for the H14 (intermediately annealed and finally cold rolled) delivery condition than the others. The annealing, H24 and O, improves the post braze strength compared to the only cold rolled H18 condition. The annealing significantly improves the sagging resistance and further improves the delivery formability, $A_{50mm}$, as well as decreases the risk for liquid core penetration.

The H24 delivery condition gave significantly improved formability and better sagging resistance compared to the H14 delivery temper. The H24 condition gave much better sagging resistance, better resistance to liquid core penetration and a clearly improved delivery formability and post braze strength compared to the H18 condition. O temper condition gave better delivery formability and sagging resistance than H24 condition but is not attractive due to handling problems of very soft and thin material prior to brazing as well as the risk for liquid core penetration after forming as described in Example 4.

TABLE 3

Properties measured for material C.
The sagging resistance was measured using a cantilever beam length of 50 mm.

| Delivery Temper | As delivery $Rp_{0.2}$ [MPa] | As delivery $A_{50\,mm}$ [%] | Sagging distance [mm] | Liquid core penetration | Post braze Strength [MPa] |
|---|---|---|---|---|---|
| H18 | 208 | 2.5 | 45 (max) | Some | 70 |
| H24 | 163 | 5.3 | 16 | No | 77 |
| O | 61 | 10.4 | 11 | No | 78 |
| H14 | 184 | 1.5 | 23 | No | 57 |

Example 4

The O temper condition is not a suitable delivery temper as such soft and thin strip causes severe handling problems, both for strip producers and manufacturers of brazed heat exchangers. One of the problems is that the strip always will be slightly stretched prior to brazing. This can cause a poor brazing performance as the core then becomes extremely susceptible to liquid core penetration if delivered in O temper instead of H24 temper. A material D with the following composition was used to show this:

Core Mn=1.6%, Si=0.8%, Fe=0.2%, Zn=1.5%, Zr=0.12%, other elements each less than 0.05%.

Braze clad Si=7.5%, Fe=0.2%, other elements each less than 0.05%.

The material was clad on two sides with 10% braze clad on each side. Cladding was carried out during hot rolling.

The material was industrially produced according to the described invention to a final thickness of 0.07 mm. Some material was temper annealed to H24 condition, $Rp_{0.2}$=164 MPa, and some to fully soft O condition, $Rp_{0.2}$=60 MPa. Different amounts of stretching of 0%, 1%, 3% and 5% was then applied to the samples prior to brazing.

Figure 2:
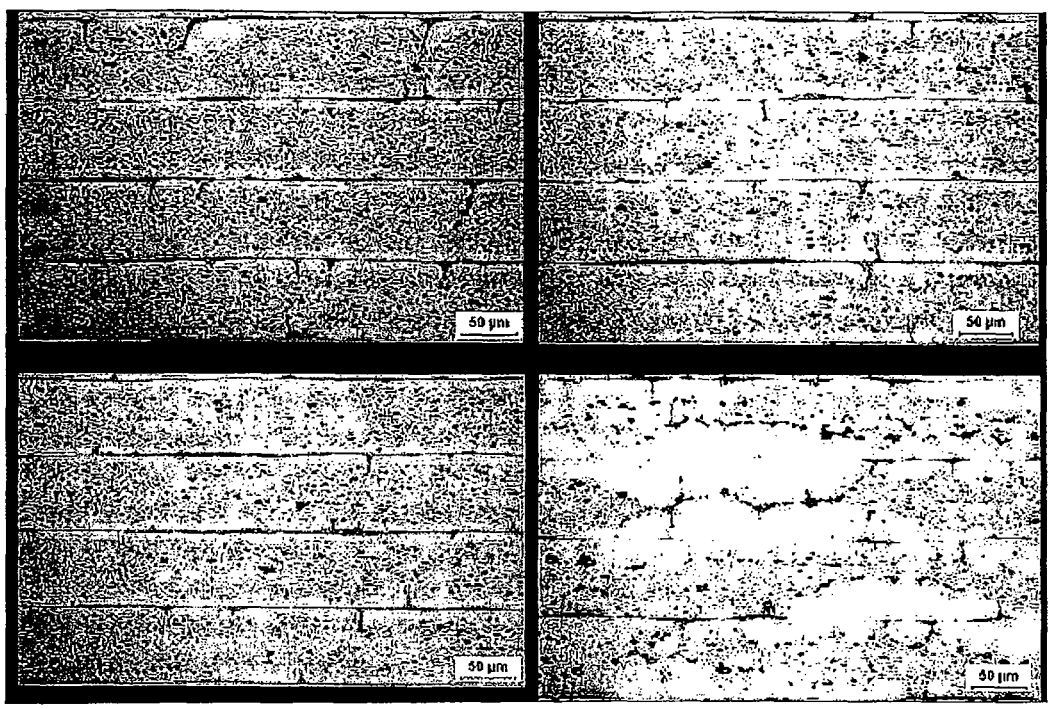
FIG. 2a shows the microstructure of material C after brazing from H24-temper (left) and O-temper (right) after 1% pre-stretching prior to brazing.
FIG. 2b shows the microstructure of material C after brazing from H24-temper (left) and O-temper (right) after 3% pre-stretching prior to brazing.

The photographs in FIG. 2 show that severe liquid core penetration has occurred during brazing for the O temper but not for the H24 temper when the samples were pre-stretched to 3%. Similar results were obtained for 5% pre-stretching. None of the delivery tempers are sensitive for liquid core penetration if the pre-stretching is 1% or less. As pre-stretching to more than 1% is likely to occur prior to brazing, the O temper condition is not suitable.

Example 5

An alloy consisting of 1% Mn, 1% Si, 0.5% Fe, 0.09% Cu, 1% Zn was twin-roll cast as a 5 mm thick strip, cold rolled to 1 mm, annealed to a soft condition, rolled to 0.10 mm thickness and finally annealed for two hours at 260° C. The 0.2% proof stress value, $R_{p0.2}$ was 130 MPa and the elongation, $A_{50mm}$, was 4.4%. The post braze strength, $R_{p0.2}$, was 70 MPa, and the ultimate strength, $R_m$, 165 MPa. The sagging was only 9 mm, when measured as described in example 1.

The invention claimed is:

1. A sagging resistant strip produced by
   a) casting a melt comprising:
      0.3-1.5 wt % Si,
      ≤0.5 wt % Fe,
      ≤0.3 wt % Cu,
      1.0-2.0 wt % Mn,
      ≤0.5 wt % Mg,
      ≤4.0 wt % Zn,
      ≤0.3 wt % each of dispersoid forming elements from group IVb, Vb, or VIb, and
      unavoidable impurity elements, each at most 0.05 wt %, in a total amount of at most 0.15 wt %, the rest aluminium, to obtain an ingot;
   b) preheating the resulting ingot at a temperature of less than 550° C. to form dispersoid particles;
   c) hot rolling to obtain a strip,
   d) cold rolling the strip obtained in step c) with a total reduction of at least 90%, resulting in a strip having a first proof stress value;
   e) followed by a heat treatment to the delivery temper to soften the material by a tempering without any recrystallisation of the strip alloy, in such a way that a strip is obtained having a second proof stress value which is 10-50% lower than the first proof stress value (obtained directly after cold rolling in step d), and lying in the 0.2% proof stress range of 100-200 MPa;
   wherein the sagging resistant strip has a 0.2% proof stress value after brazing of at least 60 MPa and a sagging resistance of ≤35 mm when measured on a 0.10 mm thick strip using a cantilever beam length of 60 mm.

2. A sagging resistant strip according to claim 1, produced by a cold rolling reduction of at least 97.5%.

3. A sagging resistant strip according to claim 1, produced without intermediate annealing giving recrystallisation of the material when the thickness of the material has been reduced by more than 90% during cold rolling in step d).

4. A sagging resistant strip produced by
   a) twin-roll strip casting a melt comprising:
      0.3-1.5 wt % Si,
      ≤0.5 wt % Fe,
      ≤0.3 wt % Cu,
      1.0-2.0 wt % Mn,
      ≤0.5 wt % Mg,
      ≤4.0 wt % Zn,
      ≤0.3 wt % each of dispersoid forming elements from group IVb, Vb, or VIb, and
      unavoidable impurity elements, each at most 0.05 wt %, in a total amount of at most 0.15 wt %, the rest aluminium;
   b) cold rolling the as-cast strip to form an intermediate gauge material;
   c) annealing the intermediate gauge sheet material to form dispersoid particles,
   d) cold rolling the intermediate gauge article to a finstock material of final gauge with a rolling reduction of at least 60%, resulting in a finstock material having a first proof stress value;
   e) heat treating the finstock material to the delivery temper to soften the material by a tempering without any recrystallisation of the strip alloy, in such a way that a strip is obtained having a second proof stress value which is 10-50% lower than the first proof stress value obtained directly after cold rolling in step d), and lying in the 0.2% proof stress range of 100-200 MPa; wherein the sagging resistant strip has a 0.2% proof stress value after brazing of at least 60 MPa and a sagging resistance of ≤20 mm when measured on a 0.10 mm thick strip using a cantilever beam length of 60 mm.

5. A sagging resistant strip according to claim 4, produced from
a melt comprising:
0.5-1.1 wt % Si,
≤0.3 wt % Fe,
<0.1 wt % Cu,
1.3-1.8 wt % Mn,
<0.1 wt % Mg,
0.05-0.2 wt % Zr.

6. A sagging resistant strip according to claim 4, produced from a melt comprising: between 0.5 and 2.8 wt % Zn.

7. A sagging resistant strip according to claim 4, produced from a melt comprising: <0.009 wt % Sn.

8. A sagging resistant strip according to claim 4, having in the delivery temper a dispersoid particle density in the range 1 and $20 \times 10^6$ particles/mm$^2$ of particles having a diameter in the range of 50-400 nm.

9. A sagging resistant strip according to claim 4, having a final thickness of the strip less than 0.2 mm.

10. A sagging resistant strip according to claim 4, the strip being clad with at least one additional layer.

11. A sagging resistant strip according to claim 10, where the at least one additional layer consists of a braze alloy.

12. A sagging resistant strip according to claim 10, where the at least one additional layer consists of a commercially pure aluminium alloy.

13. A sagging resistant strip according to claim 10, where the at least one additional layer consists of an aluminium alloy comprising 0.6-6.5 wt % Si.

14. A sagging resistant strip according to claim 1, wherein the elongation of the product obtained from step e) is equal to or less than about 6.8%.

15. A sagging resistant strip according to claim 1, wherein the elongation of the product obtained from step e) is equal to or less than about 5.3%.

16. A sagging resistant strip according to claim 4, wherein the elongation of the product obtained from step e) is equal to or less than about 6.8%.

17. A sagging resistant strip according to claim 4, wherein the elongation of the product obtained from step e) is equal to or less than about 5.3%.

18. A sagging resistant strip according to claim 4, wherein the elongation of the product obtained from step e) is equal to or less than about 4.4%.

19. A sagging resistant strip according to claim 1, wherein the 0.2% proof stress value after brazing is at least about 70 MPa.

20. A sagging resistant strip according to claim 4, wherein the 0.2% proof stress value after brazing is at least about 70 MPa.

21. A sagging resistant strip according to claim 1, wherein the 0.2% proof stress value after brazing is in a range of 60 MPa to 70 MPa.

22. A sagging resistant strip according to claim 4, wherein the 0.2% proof stress value after brazing is in a range of 60 MPa to 70 MPa.

* * * * *